April 10, 1956    P. L. ALSPAUGH    2,741,468
BORE MINING APPARATUS WITH STRATA SENSING MEANS
Filed Dec. 1, 1951

INVENTOR
PAUL L. ALSPAUGH
BY
ATTORNEY

United States Patent Office 2,741,468
Patented Apr. 10, 1956

2,741,468

BORE MINING APPARATUS WITH STRATA SENSING MEANS

Paul L. Alspaugh, South Charleston, W. Va., assignor to Union Carbide and Carbon Corporation, a corporation of New York Application December 1, 1951, Serial No. 259,383

1 Claim. (Cl. 262—26)

This invention relates to bore mining, and more particularly to an apparatus responsive to the nature of earth strata being cut by a boring machine.

In many bore mining operations, such as when using a horizontal boring machine for the mining of coal, it is extremely important to keep the machine working in a seam of coal and out of adjacent strata of rock or clay. To accomplish this it is necessary to know at all times the nature of the strata in which the machine is boring. This intelligence must be conveyed as rapidly as possible to a control point remote from the cutter bits of the boring machine so that the machine can be shut off, either manually or automatically, before the cutting teeth are damaged in the attempt to cut through rock.

It is an object of the present invention to provide an apparatus for a bore mining machine which will continuously respond to the nature of strata being cut by the machine.

It is a further object to provide an apparatus for a bore mining machine which rapidly responds to changes in nature of strata and rapidly conveys this intelligence to the remote point.

Other objects and advantages of this invention will be apparent during the course of the following description.

It has been found that the temperature of the cutter bits of a boring machine greatly and rapidly increases as the hardness of the strata encountered increases. The present invention, based on this phenomenon, employs a thermocouple mounted in one of the forwardly located outer teeth of the boring machine. As the machine begins to leave the coal seam there is a rapid temperature change in the tooth. If the tooth enters an area of rock after leaving the seam there will be a rapid increase in its temperature, while a drop in temperature will occur if clay or a similar soft strata is encountered. The thermocouple mounted in the temperature sensitive scanner tooth is electrically connected to a remote control point and thereby conveys temperature readings to a meter at that point. By observing the meter temperature readings the operator can stop and change the direction of the boring machine whenever these readings indicate that the machine is leaving the coal seam. As an alternative to thermocouple temperature readings and manual operation, the thermocouple voltage can be used to actuate a conventional relay which breaks the power circuit thereby stopping the cutter head motion whenever the machine leaves the coal seam.

Figure 1:
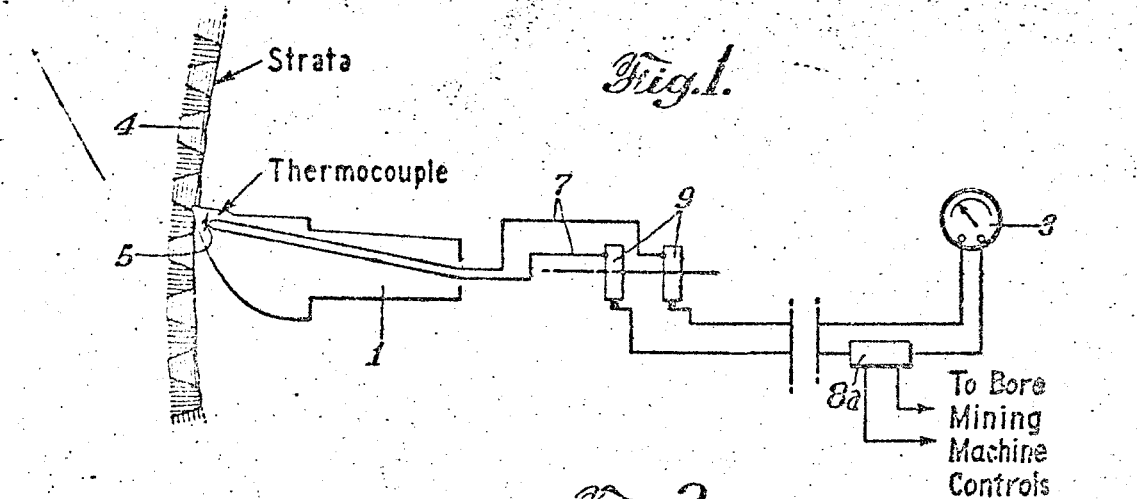
Fig. 1 is a schematic view showing the scanner cutting tooth of the present invention and the electrical connections between the thermocouple mounted in the scanner tooth and the indicating meter at a point remote therefrom.

As shown in the drawing, a temperature sensitive scanner cutting tooth 1 is carried by an arm assembly 2 mounted on a rotary cutting head 3 of a horizontal boring machine for mining sub-strata material 4. A suitable thermocouple 5, such as an iron-constantan thermocouple, is mounted in bore 6 of scanner tooth 1. Electrical connections 7 are provided between the thermocouple and a conventional thermocouple meter 8 calibrated in degrees Fahrenheit and mounted in the control house of the boring machine. Suitably, automatic cutoff relay means 8a may be provided to stop the bore mining machine when rock is encountered, as indicated by thermocouple response. Slip rings 9 provide a closed electrical circuit between the thermocouple and the meter despite the rotation of cutter head 3.

Figure 2:
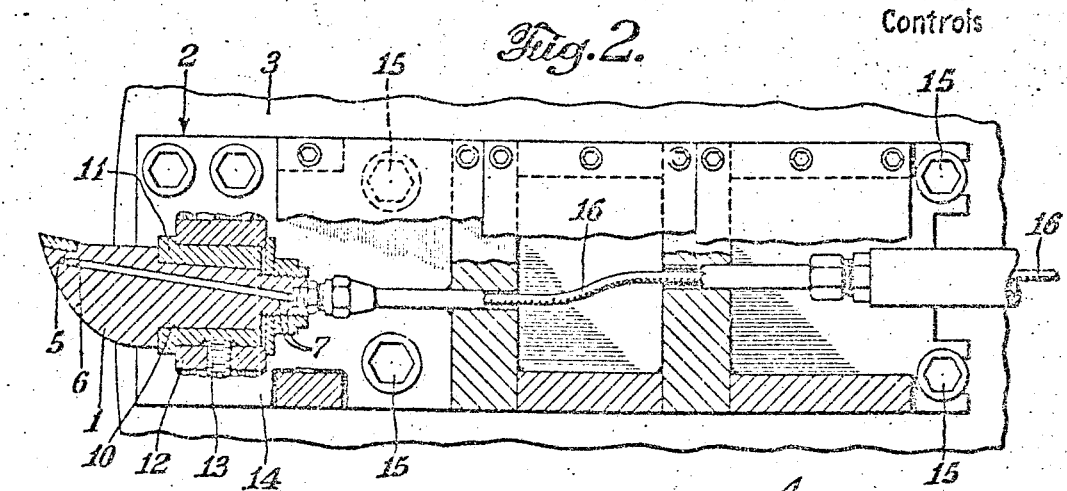
Fig. 2 is a view, partly in elevation and partly in cross section, of a scanner tooth arm assembly embodying the present invention.

As is shown in greater detail in Fig. 2, the scanner tooth 1 has a tapered shank 10 fitted into a metal sleeve 11 which, in turn, is mounted in hollow bracket 12. A set screw 13 threaded in a lateral hole in the bracket 12 engages and helps to hold metal sleeve 11 in position. The bracket 12 is welded to assembly-supporting member 14 which, in turn, is secured to the cutter head 3 by bolts 15. Electrical connections 7 from thermocouple 5 are carried through arm assembly 2 to slip rings 9 by means of cable 16.

Figures 3, 4:
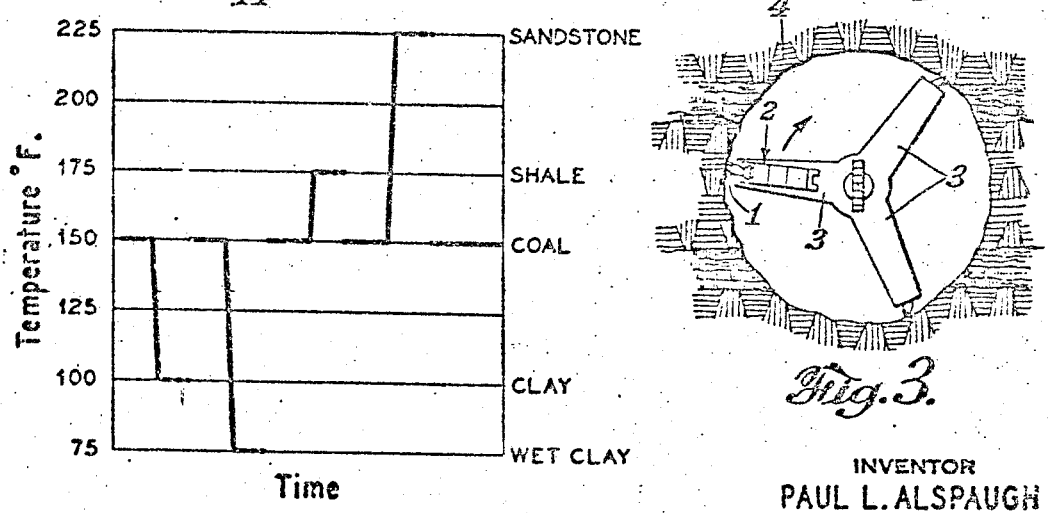
Fig. 3 is a view, partly in front elevation and partly in section, of a cutter head-mounted scanner tooth arm assembly embodying the present invention.
Fig. 4 is a graph showing the relationship between indicated scanner tooth temperature and time as the boring machine cuts strata of varying nature.

An apparatus embodying the present invention has been employed in combination with a horizontal rotary coal boring machine, as described in the copending application Serial No. 85,222, filed April 2, 1949, and entitled "Mining Machine," now Patent Number 2,699,328. A rotary cutting head of such a machine is shown, in end view, in Fig. 3 of the drawing. While cutting along a coal seam under normal conditions, at a rate of advance of 12 inches a minute and a cutter head speed of 60 revolutions per minute, the temperature of the scanner tooth, as indicated by the thermocouple meter, was approximately 150° F. At times when the machine encountered a clay crack, verified later by observation of the material delivered to the conveyer system of the machine, and by visual inspection of the hole after completion of the cutting operation, the observed thermocouple temperature dropped sharply to 100° F. within 3–5 seconds. In one case, an extremely wet clay stratum caused the temperature to drop to 75° F. A narrow band of sandstone was encountered causing the thermocouple temperature to rise to 175° F. Temperatures exceeding 225° F. have been observed when wide bands of rock were encountered. The indicated meter readings of temperature plotted as a function of time, for the cutting operation described above, are shown in Fig. 4 of the drawing.

During these bore mining operations the apparatus embodying the present invention has shown a very rapid response to variations in strata nature. When the sandstone band was encountered, the response time for the 25-degree increase in indicated temperature was between one and two seconds.

The wide range of thermocouple temperature variation together with good response time provides rapid and accurate means for determining the nature of strata encountered by the cutting tooth of a bore mining machine, and, whether used to indicate scanning tooth temperature for manual operation or for automatic cutoff, serves the purpose of preventing damage to the cutting tooth when rock is encountered.

What is claimed is:

In a bore mining machine having a rotary cutter head adapted to be advanced into desired strata of material to be mined, means for indicating at a remote station a change in the strata being cut by said mining machine comprising a cutting tooth mounted on said rotary cutter head in actual cutting relation to the strata being cut, means for sensing variations in temperature generated in said cutting tooth as the cutter head advances and cuts into different strata having a hardness different from the desired material and for translating said temperature variations into electrical signals, indicating means positioned at a station remote from said bore mining machine and adapted to respond to said electrical signals for indicating at such remote point the nature of the different strata encountered by said cutting tooth and circuit means for transmitting said electrical signals to said indicating means.

References Cited in the file of this patent

UNITED STATES PATENTS

| | | |
|---|---|---|
| 2,161,256 | Karcher | June 6, 1939 |
| 2,249,769 | Leonardon | July 22, 1941 |
| 2,314,753 | Asimow | Mar. 23, 1943 |
| 2,569,390 | Sewell | Sept. 25, 1951 |
| 2,620,386 | Alspaugh et al. | Dec. 2, 1952 |
| 2,699,328 | Alspaugh et al. | Jan. 11, 1955 |